United States Patent [19]
Szinai et al.

[11] 3,859,352
[45] Jan. 7, 1975

[54] ADAMANTANE COMPOUNDS

[75] Inventors: Stephen S. Szinai, Wokingham, England; William H. W. Lunn, Indianapolis, Ind.

[73] Assignee: Eli Lilly and Company, Indianapolis, Ind.

[22] Filed: Sept. 19, 1973

[21] Appl. No.: 398,727

Related U.S. Application Data

[60] Continuation of Ser. No. 197,175, Nov. 9, 1971, abandoned, which is a division of Ser. No. 32,406, April 27, 1970, Pat. No. 3,668,220, which is a division of Ser. No. 675,037, Oct. 13, 1967, Pat. No. 3,591,642.

[52] U.S. Cl. .......................................... 260/563 P
[51] Int. Cl. ............................................ C07c 87/40
[58] Field of Search ............................... 260/563 P

[56] References Cited
UNITED STATES PATENTS
3,489,802  1/1970  Brake .............................. 260/563 P
FOREIGN PATENTS OR APPLICATIONS
1,541,582  10/1968  France ............................ 260/563 P OTHER PUBLICATIONS
Lunn et al., "J. Chem. Soc." (1968) C pp. 1657–60.
Gerzon et al., "J. Med. Chem." Vol. 6 (1963) pp. 760–763.

*Primary Examiner*—Lewis Gotts
*Assistant Examiner*—D. R. Phillips
*Attorney, Agent, or Firm*—Kathleen R. S. Page; Everet F. Smith

[57] ABSTRACT

The present invention is directed to adamantane compounds of the formulae:

I

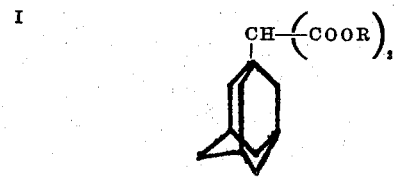

II

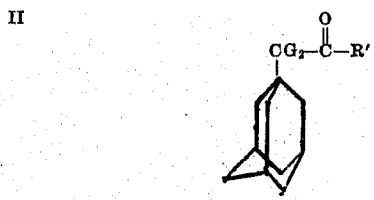

III

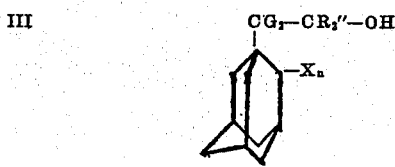

IV

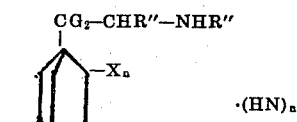

V

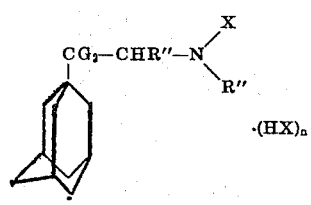

VI

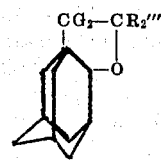

VII

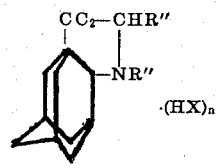

VIII
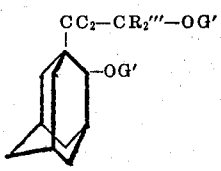

wherein each G independently represents hydrogen or straight-chain alkyl of from 1 to 6, both inclusive, carbon atoms; G' represents hydrogen or acetyl; R represents hydrogen or alkyl of from 1 to 6, both inclusive, carbon atoms; R' represents halo, alkoxy containing from 1 to 6, both inclusive, carbon atoms in the alkyl group, hydrogen or alkyl of from 1 to 6, both inclusive, carbon atoms; each R'' independently represents hydrogen or alkyl of from 1 to 6, both inclusive, carbon atoms; each R''' independently represents hydrogen or alkyl of from 1 to 6, both inclusive, carbon atoms, or both R''' groups taken together represent oxo(=O); X represents halo; and each n independently represents an integer of from 0 to 1, both inclusive. The terms "halo" and "halide" are employed herein to designate occurrences of bromine, chlorine, and iodine.

The adamantane compounds of formulae VII and VIII are useful as agents to achieve a depressant action on the central nervous system of warm blooded animals. The adamantane compounds of Formulae I, II, III, IV, V and VI are useful as intermediates in the synthesis of the compounds of Formulae VII and VIII.

5 Claims, No Drawings

ADAMANTANE COMPOUNDS

CROSS-REFERENCE TO RELATED APPLICATIONS

This is a continuation of our copending application Ser. No. 197,175, filed Nov. 9, 1971 now abandoned, which was in turn a division of our then copending application Ser. No. 32,406, filed Apr. 27, 1970 and issued June 6, 1972 as U.S. Pat. No. 3,668,220. Application Ser. No. 32,406 was, in turn, a division of our then copending application Ser. No. 675,037, filed Oct. 13, 1967 and issued July 6, 1971 as U.S. Pat. No. 3,591,642.

BACKGROUND OF THE INVENTION

Adamantane is a unique organic chemical having the following structure:

As will be evident from this structural formula, the 1, 3, 5, and 7 positions, the so-called bridgehead positions, are equivalent; and similarly, the 2, 4, 6, 8, 9 and 10 positions, the so-called methylene positions, are equivalent. Although adamantane has been known for many years as a minor constituent of various petroleums, it was only around 1960 that methods become available for its synthesis by ring closure of the bicyclo (3.3.1) nonane system. Since then, a considerable amount of research has been carried out in an attempt to obtain various derivatives of admantane. While many derivatives have been procured from adamantane, they are almost exclusively derivatives which are functionalized at the bridgehead positions or solely at the methylene positions.

SUMMARY OF THE INVENTION

The present invention provides a unique approach to 1,2-disubstituted adamantane compounds.

The subject matter of the present invention can more readily be understood by reference to the following summary reaction scheme. In this presentation, the symbol "Ad-" is used to designate a 1-adamantyl radical, and the symbol "Ad<,"

to designate a divalent 1,2-adamantylene radical.

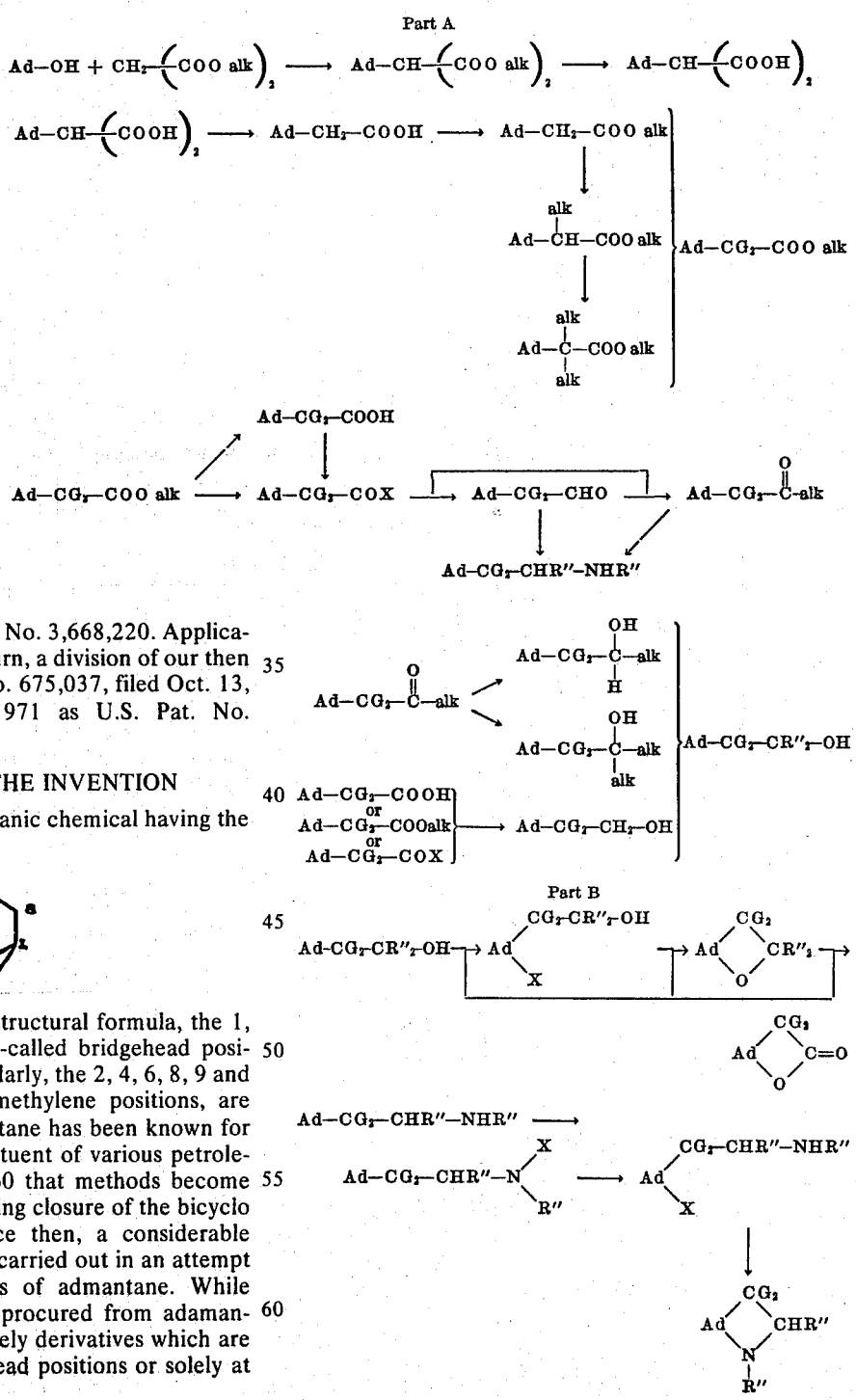

DETAILED DESCRIPTION OF THE INVENTION

Part A

Part A of the present invention is concerned with the synthesis of 1-adamantaneethanol compounds serving as the immediate precursors for the cyclization reactions of Part B.

In a first embodiment, compounds of formula I;

(I)
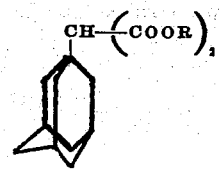

wherein R is as hereinabove defined, are prepared by reacting 1-adamantanol with a dialkyl malonate, to obtain the corresponding dialkyl 1-adamantanemalonate, (that compound of formula I wherein R represents alkyl), which is then hydrolyzed to obtain the corresponding free acid (that compound of formula I wherein R represent hydrogen). The compounds of formula I are useful as materials from which to synthesize the compounds of formulae II and III.

The above reaction of 1-adamantanol and dialkyl malonate goes forward readily in the presence of a Lewis Acid catalyst, and at temperatures of from $-10°$ to $50°$ C., yielding the desired product and water as by-product. Preferably, the reaction is conducted in an inert liquid reaction medium, such as an alkane, for example, hexane. Particularly good results are obtained when employing the reactants in substantially equimolecular amounts.

Following completion of the reaction, the desired dialkyl 1-adamantanemalonate can be separated from the reaction mixture as its boron difluoride complex, in which case the complex is suspended in an inert hydrocarbon and distilled to drive off the boron complexing portion, leaving the free dialkyl ester which can be separated as such or hydrolyzed with base to obtain the corresponding free acid. If the complex is not isolated, the reaction mixture is subjected to hydrolysis conditions wherefrom the malonic acid is obtained directly by methods well known to the art.

The exact nature of complex obtained when boron trifluoride is employed in the reaction of an alkanol and a dialkyl malonate is not known. Generally, the following structure is assigned:

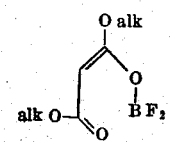

and such structure is in conformity with the elemental analysis for such products, which analysis shows one mole of $BF_2$ per mole of malonate. However, an alternate resonating structure is sometimes suggested:

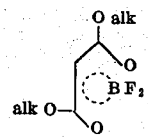

Thus, it is believed that the following structure:

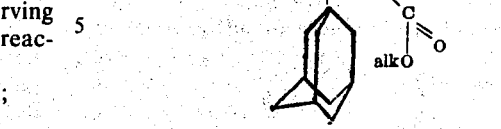

can be assigned to the boron complex obtained when boron trifluoride is employed in the present reaction of 1-adamantanol and a dialkyl malonate, although the alternate structure:

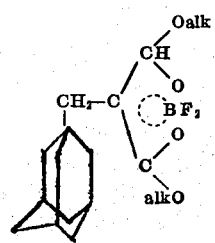

is not excluded.

In a second embodiment, leading to the compounds of formula II and to those compounds of formula IV wherein the n subscript of X (the substituent on the 2-position of the adamantane ring) is zero:

II
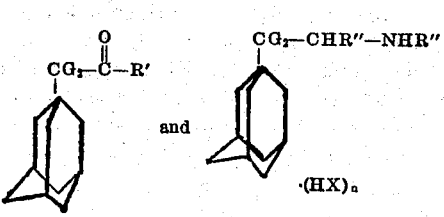

wherein the symbols G, R′, R″, X and n are as hereinabove defined, the free acid of formula I is decarboxylated to obtain 1-adamantaneacetic acid, which can readily be converted to the corresponding acyl halide. To obtain those acyl halides wherein one or both G symbols stand for alkyl, the 1-adamantaneacetic acid is esterified and then alkylated on the alpha position, and the resulting alkylated ester converted to the corresponding acyl halide by procedures which will be described hereinafter. All acyl halides, regardless of whether G is hydrogen or alkyl, are then further reacted to obtain those products wherein R′ represents hydrogen or alkyl, as defined.

The compounds of formula II wherein R′ is halo, alkyl, or alkoxy are useful as intermediates in the synthesis of the compounds of formula III; and the compounds of formula II wherein R′ is hydrogen or alkyl are useful as intermediates in the synthesis of compounds of formula IV wherein the n subscript of X (the substituent on the 2-position of the adamantane ring) is zero.

The above decarboxylation of the 1-adamantanemalonic acid can be carried out by heating it to a temperature above its thermal decomposition temperature, such as a temperature in the range of $190°$ to $250°$ C. The decarboxylation goes forward readily merely upon heating to the specified temperature range. Decarboxylation results in the desired 1-adamantaneacetic acid with carbon dioxide as a by-product. The 1-adamantaneacetic acid product is cooled to effect crystallization and can be purified by recrystallization from a suitable solvent.

Thereafter, 1-adamantaneacetic acid is esterified, as by reaction with an excess amount of an alkanol in the presence of a mineral acid, for example sulfuric acid. The resulting ester can be alkylated to introduce one or two groups of the identity of G onto the alpha carbon atom. The alkylation comprises reacting the ester with an alkyl halide (GX) in the presence of a compound which converts the ester to its enolate form, for example, tritylsodium, sodium hydride, or sodium ethoxide. The reaction is carried out as described for method 299 of Wagner and Zook, "Synthetic Organic Chemistry," (New York, N.Y.: Wiley and Sons, Inc., 1953), page 489 and references therein cited. This method is taught as giving only poor yields of alkylated product where, as here, the alpha carbon atom has two hydrogen atoms; these low yields are purportedly due to the tendency of such esters to undergo a competitive seld-condensation reaction. However, the bulkiness of the adamantane ring severely limits such self-condensation; thus, both alpha hydrogen atoms can be replaced by this method, although yields on the second alkylation step will be lower. Furthermore, two different alkyl groups can be introduced by stepwise reaction with each of two different alkyl halide compounds.

The 1-adamantaneacetic acid esters thus obtained:

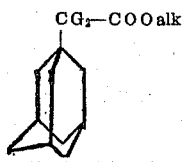

are readily hydrolyzed, by methods well known to the art, to the free acid compounds:

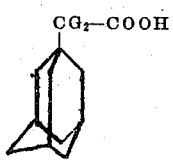

These free acid compounds or the corresponding esters are readily converted to the corresponding acetyl halide, such as by reaction with phosphorus trichloride, phosphorus tribromide, phosphorus pentachloride, or thionly chloride, or, especially in the instance of the iodides, by halide exchange of an already obtained acyl halide, employing free HX as the reactant. In addition, the 1-adamantaneacetic acid compounds can be converted to their corresponding alkyl esters, as by reaction with the alkanol of the desired alkyl ester group in the presence of a catalytic quantity of a mineral acid. These reactions are carried out in accordance with known procedures—see Wagner and Zook, op. cit., especially chapters 14 and 17, and references therein cited.

The 1-adamantaneacetyl halide compounds thus prepared are thereafter employed to prepare other compounds according to formula II wherein R' represents hydrogen or alkyl. Those products wherein R' represents hydrogen are readily prepared by the socalled Rosenmund reaction:

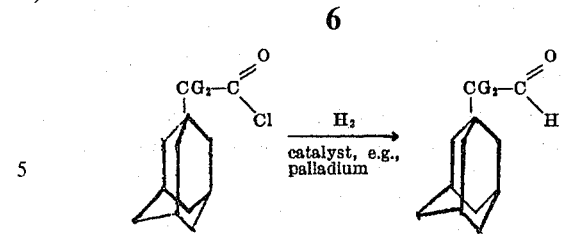

[Wagner and Zook, op. cit., page 291 and Houben-Weyl, "Methoden der Organischen Chemie," (Stuttgart, Germany: Georg Thieme Verlag), 4th Edition, Band 7, Teil 1, pages 289–290]. The corresponding ketones, e.g., those products of formula II wherein R' represents alkyl of from one to six, both inclusive, carbon atoms, are prepared by reacting the corresponding 1-adamantaneacetaldehyde with an alkyl magnesium halide:

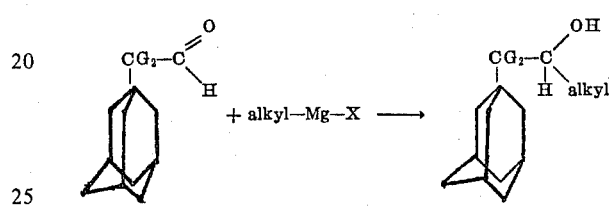

[Wagner and Zook, op. cit., pages 159–160 and references therein cited and Kharasch et al., "Grignard Reactions of Nonmetallic Substances" (New York, N.Y.: Prentice-Hall Inc., 1954) Chapter VI] and thereafter oxidizing (Wagner and Zook, op. cit., pages 323–326 and references therein cited) to obtain the desired ketone:

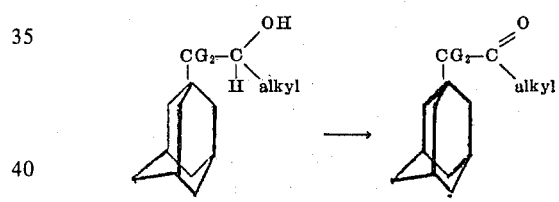

Thus, in these procedures are prepared all of the compounds of the formula:

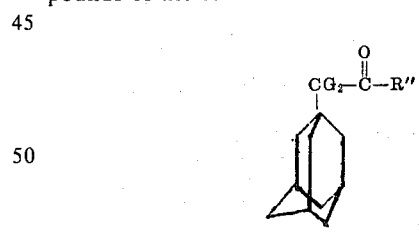

wherein R" is hydrogen or alkyl as defined. However, many of these compounds are also readily prepared by an alternate reaction scheme. In this alternate scheme, a 1-adamantaneacetyl halide is reacted with diethyl malonate as its sodium or magnesiumethoxy derivative to yield an adamantaneacetyl malonate; this compound, in turn, is hydrolyzed and the diacid thus obtained decarboxylated to obtain compounds where R" is an alkyl group in which the alpha carbon atom bears at least one hydrogen. The reaction scheme can be summarized as follows:

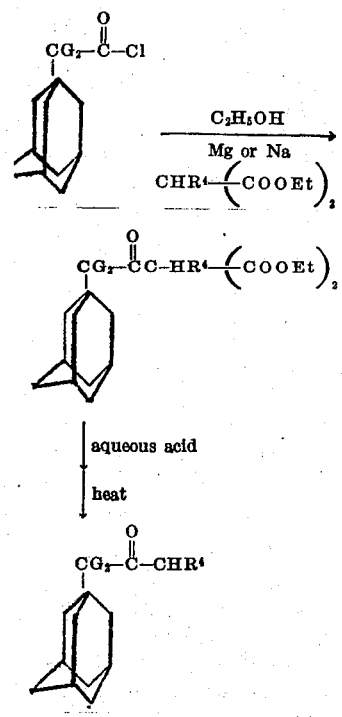

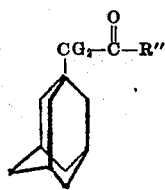

wherein $R^4$ is hydrogen or $C_1$–$C_5$ alkyl and G has the same meaning as hereinabove. The reaction is carried out in accordance with known procedures: see for example Walker et al., *Journal of the American Chemical Society* 68, (1946), page 1386.

However, regardless of the manner in which the compound of the formula,

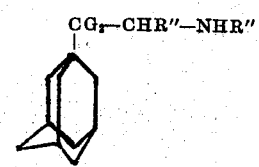

wherein R'' is hydrogen or alkyl as defined, is prepared, the compound can thereafter by subjected to reductive amination with a compound of the formula $NH_2R''$ in which R'', as above defined, is hydrogen or alkyl of $C_1$–$C_6$, by procedures well known in the prior art: see Wagner and Zook, op. cit., chapter 24, pages 662–664, and references therein cited, Houben-Weyl, op. cit. Band 11 Teil 1, page 602 and following, and N. G. Gaylord, "Reduction with Complex Metal Hydrides," (New York, N.Y.: Interscience Publishers, 1956) page 322 and following.

The compounds resulting from the reductive amination:

$$CG_2\text{—CHR''—NHR''}$$

wherein G and R'' have the same meaning as hereinabove, are useful as intermediates in the subsequent cyclization reactions of Part B to make the products of Formulae V and VII, as well as the products of Formula IV wherein the n subscript of X (at the 2 position of the adamantane ring) is one, which latter products are similarly useful in the subsequent cyclization reactions of Part B.

Subsequently, in a third embodiment, the 1-adamantaneacetic acid, or corresponding ester or acyl halide compounds, are reduced to prepare the corresponding 1-adamantaneethanol compounds, those compounds of Formula III wherein each R'' represents hydrogen and n represents zero.

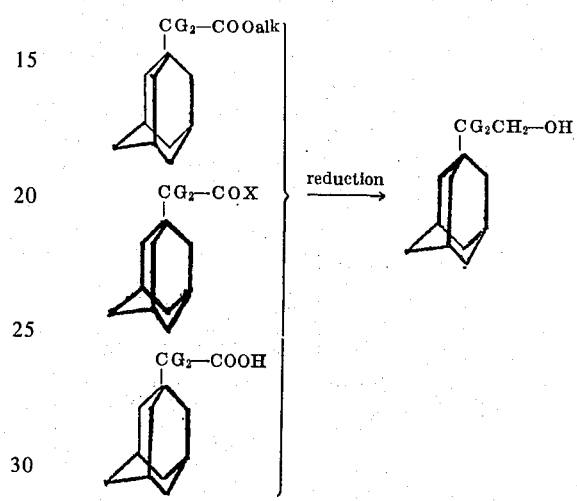

wherein G is as defined hereinabove. These compounds, as well as all of the compounds of Formula III wherein n represents zero, are useful as intermediates in the synthesis of the compounds of Formula VI as well as those compounds of Formula III wherein n represents one.

The precise reduction reaction employed to prepare the adamantaneethanol compounds is not critical. In a preferred reaction, a 1-adamantaneacetic acid compound:

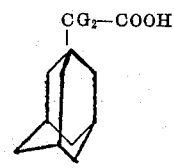

is reduced by reaction with lithium aluminum hydride in an inert liquid reaction medium. Suitable media include organic liquids, including ethers such as diethyl ether, tetrahydrofuran, and the dimethyl ether of diethylene glycol. The reaction mixture is preferably cooled below room temperature during initial contacting of the acid and lithium aluminum hydride. Thereafter, temperatures of 20° to 60° C. are acceptable and convenient. Particularly good results are obtained when employing the reactants in amounts representing three or more molecular proportions of lithium aluminum hydride for every two molecular proportions of the 1-adamantaneacetic acid compound.

Those compounds of Formula III wherein one or both R'' groups are other than hydrogen and wherein n is zero are also readily prepared. Where only one R'' is a group other than hydrogen, such compound is readily achieved as hereinabove discussed, by reaction of the corresponding 1-adamantaneacetaldehyde with an appropriate alkyl magnesium halide:

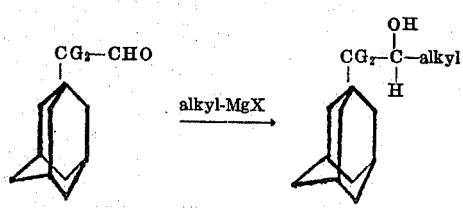

Also, the same compound can be prepared by reduction of the corresponding ketone:

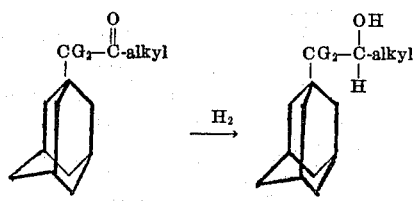

In either manner, there is achieved the desired compound of Formula III wherein one R'' is a group other than hydrogen, and n is zero. Those compounds of Formula III wherein both R'' groups are other than hydrogen and n is zero are prepared in a similar reaction of the compound of Formula II wherein R' is alkyl, as defined, with an alkyl magnesium halide:

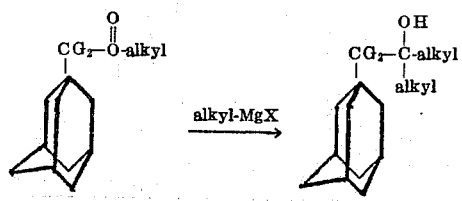

Thus, by these various procedures all the compounds of Formula III wherein n is zero can be prepared. Those compounds according to Formula III wherein n is one are prepared and utilized as described hereinbelow in Part B.

Part B

Part B of the present invention is concerned with the cyclization of certain of the compounds prepared as described hereinabove in Part A, these reactions yielding additional new compounds of the following formulae:

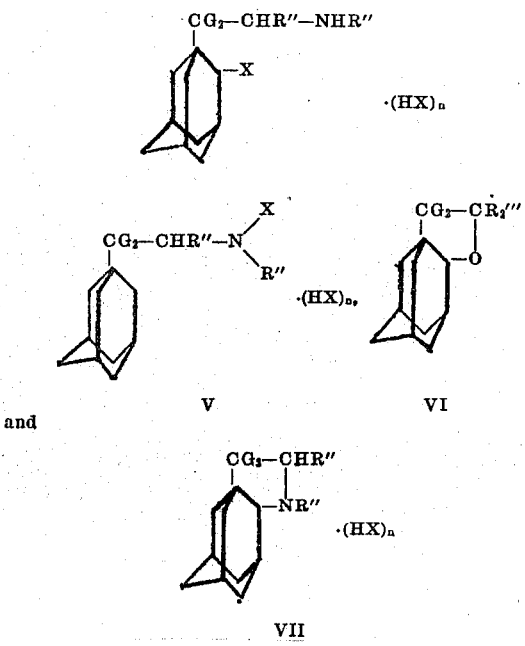

As above defined, each G independently represents hydrogen or straight-chain alkyl of from one to six, both inclusive, carbon atoms; each R'' independently represents hydrogen or alkyl of from one to six, both inclusive, carbon atoms; each R''' independently represents hydrogen or alkyl of from one to six, both inclusive, carbon atoms, or both R''' groups taken together represent oxo; X represents halo; and each n independently represents an integer of from 0 to 1, both inclusive. The compounds of Formula VI are useful as intermediates in the synthesis of the compounds of Formula VIII (Part C, hereinbelow), and the compounds of Formula V are useful as intermediates in the synthesis of the compounds of Formula VII. The utility of the compounds of Formulae VII and VIII is discussed in more detail hereinbelow.

In the first synthetic procedure, suitable for the preparation of all of the compounds of both Formulae VI and VII, the corresponding acyclic compound of one of the formulae

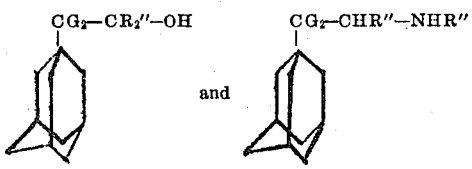

is initially reacted in an aqueous medium with hypohalite, which can be supplied as the acid or as a salt, preferably with an alkaline earth or alkali metal. This reaction results in the preparation of the corresponding —OX or —NX compound:

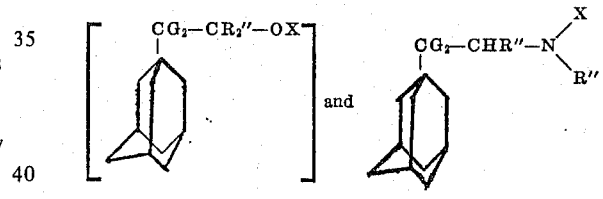

which rearrange to the corresponding 2-halo-1-adamantaneethanol or 2-halo-1-adamantaneethylamine:

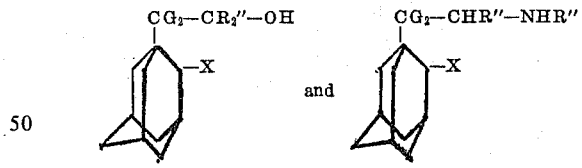

The rearrangement is spontaneous in the instance when R'' is hydrogen, methyl or ethyl; when R'' represents an alkyl group larger than ethyl, the 2-halo-1-adamantaneethanol compounds and the 2-halo-1-adamantaneethylamine compounds can be rearranged by ultraviolet light. In either instance, the resulting rearranged product is then readily dehydrohalogenated to yield the desired cyclic product of Formulae VI or VII.

The reactions involved in this cyclization are summarized in the following reaction scheme:

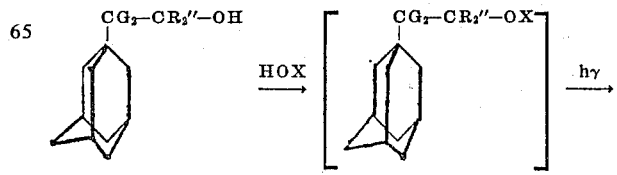

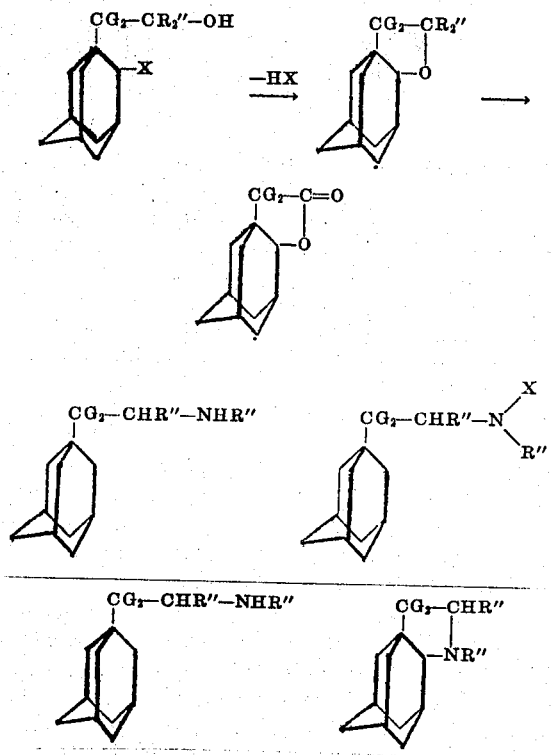

wherein G, R'', and X have the same meaning as hereinabove.

In carrying out the first step of the above reaction scheme, the acyclic compound and the hypohalite are contacted, conveniently in an inert liquid reaction medium. Suitable as such media are the halogenated hydrocarbons, for example, carbon tetrachloride, dichloromethane, chloroform, and the like. The precise form in which the hypohalite is supplied to the reaction mixture is not critical; however, preferred forms are (1) a solution, freshly prepared, of a hypohalous acid such as hypochloric or hypoiodic and (2) an alkali metal hypohalite, for example, sodium hypochlorite. The exact amounts of the reactants also employed are not critical, some of the desired product being obtained when employing any amounts. However, for good yields, it is necessary that the hypohalite be supplied in excess, such as an amount representing from 1 to 10 molecular proporations per molecular proportion of the starting 1-adamantaneethanol or 1-adamantaneethylamine compound. The reaction goes forward over a wide range of temperatures, but is conveniently and preferably conducted at room temperature.

The reaction results in the preparation of the corresponding intermediate:

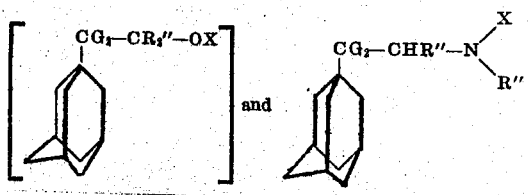

which in the instance of the latter type of compound, is readily separated from the reaction mixture by conventional procedures, typically by separation of the organic phase of the reaction mixture and removal of the reaction medium from this phase by evaporation. In the instance of the former type of product, many compounds cannot be separated, inasmuch as they undergo spontaneous rearrangement to the corresponding 2-halo-1-adamantaneethanol. This rearranged product, of course, can likewise be separated from the reaction mixture by conventional procedures.

In the instance of those compounds which do not spontaneously undergo rearrangement, as previously stated such rearrangement can be effected by exposing the compound to ultraviolet light, conveniently by exposing the original reaction mixture containing the compound to ultraviolet. The exact intensity of the ultraviolet is not critical, some of the desired 2-halo-1-adamantaneethylamine being obtained even in the presence of a weak source of ultraviolet. Separation and, if desired, purification of the 2-halo compound, are carried out in conventional procedures.

After the 2-halo-1-adamantaneethylamine or 2-halo-1adamantaneethylamine is obtained, cyclization thereof is readily effected merely by heating at a temperature sufficiently high to drive off hydrogen halide, provision being made for its safe removal. Generally, temperatures of 200° to 289° C. give good results for the 2-halo-1-adamantaneethanol compounds, while with the 2-halo-1-adamantaneethylamines, temperatures of 170° to 250° C. generally give good results. Thus, in this manner are prepared all of the cyclic products of Formulae VI and VII.

In addition, cyclic products of Formula VI are readily prepared by another cyclization procedure. In this procedure, 1-adamantaneethanol is reacted with either lead tetraacetate or mercuric acetate; either agent can be used alone or in conjunction with iodine, which enhances the rate of reaction.

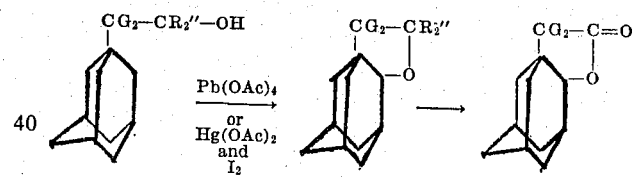

wherein G and R'' have the same meaning as hereinabove. When excess lead tetraacetate is employed, there is preferentially prepared the corresponding compound of Formula VI wherein the both R''' groups taken together represent oxo.

In carrying out the above reaction, the reactants are contacted in an inert liquid reaction medium, for example, a hydrocarbon such as benzene; and the resulting reaction mixture is held for a period of time in the reaction temperature range, approximately 10° C. to the boiling point of the particular hydrocarbon solvent. Separation and purification of the cyclized product are carried out in conventional procedures. Ultraviolet light can be used to enhance the rate of reaction.

The amine products of Formulae IV, V and VII are readily obtained as either the free base or the corresponding hydrohalide salt. The salt is prepared by reacting the free base with a hydrogen halide; in many instances, it is preferred to separate the product as the hydrohalide salt. When desired, the salt can be converted back to the free base by nertralization.

Part C

Part C of the present invention is concerned with derivatives obtained from the compounds of Formula VI by cleavage of the furan ring:

VI 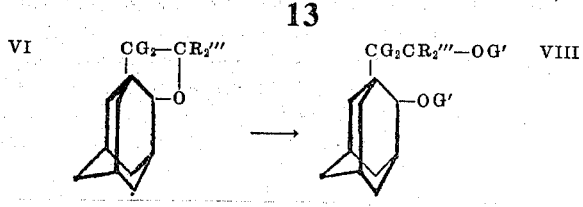 VIII

As above defined, each G independently represents hydrogen or straight-chain alkyl of from one to six, both inclusive, carbon atoms; each R''' independently represents hydrogen or alkyl of from one to six, both inclusive, carbon atoms or both R''' groups taken together represent oxo; and G' represents hydrogen or acetyl. The compounds of Formulae VII and VIII are useful as agents to achieve a depressant action on the central nervous system of warm blooded animals. The mode of administration is not critical; oral administration or administration by parenteral injection are suitable and preferred methods. Dosage rates vary with the particular compound and the particular species of animal; but generally, significant depression is obtained with the compounds of Formula VIII at rates of 100 or more milligrams/kilogram of animal body weight, by intraperitoneal injection, and at rates of 400 or more milligrams/kilogram of animal body weight, by oral administration. With the compounds of Formula VII, significant depression is obtained at dosage rates of 25 or more milligrams/kilogram of animal body weight. The compounds are thus useful to calm warm blooded animals for easier handling. In use, the compounds are combined with standard inert pharmaceutical carriers to provide useful forms for administration, including tablets, capsules, solutions for injection, and the like.

In addition, the compounds of Formulae VII and VIII are useful as antibacterial, amoebocidal and antitrichomonal agents. Good in vitro activity was found with aqueous formulations containing 500 micrograms or more per milliliter.

The derivatives of Formula VIII are obtained by cleavage of starting materials of the formula:

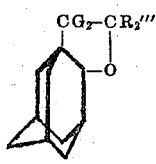

wherein G and R''' have the same meaning as hereinabove. Several methods of furan ring cleavage are known, and no precise method is critical to the preparation of the compounds of Formula VIII. However, a convenient cleavage method for compounds where R''' is hydrogen or alkyl is the reaction of the specified starting material with acetic anhydride in boron trifluoride etherate. The cleavage reaction yields a diacetate; that is, product of Formula VIII wherein G' is acetyl. The diacetate is hydrolyzed to obtain the corresponding diol; that is, product of Formula VIII wherein G' is hydroxy. The cleavage reaction goes forward at temperatures over a wide range, but is most conveniently carried out at room temperature. Good results are obtained when employing the reactants in amounts representing an excess of the acetic anhydride, such as a one- to 20-fold excess, and a catalytic amount of the etherate.

The resulting diacetate can be separated, and if desired, purified by conventional procedures. Alternatively, the reaction mixture containing the diacetate can be treated in situ with the hydrolysis agent to convert the diacetate to the corresponding diol, which is similarly separated, and if desired, purified by conventional procedures.

A convenient method for the preparation of those products of Formula VIII wherein the R''' groups are taken together and represent oxo involves a simple alkaline hydrolysis of the corresponding cyclic product.

The 2-hydroxy-1-adamantaneethanol or 2-hydroxy-1-adamantaneacetic acid product obtained in accordance with Part C can also be converted back to the corresponding cyclic product. Thus, in this embodiment, a compound of the formula:

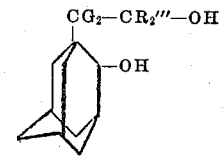

wherein G and R''' have the same meaning as hereinabove, is treated, as described hereinabove in Part B for the compounds of Formula III, with lead tetraacetate or with mercuric acetate in the presence of iodine; or by simply heating the compound. The resulting product is the same cyclized product obtained from the compounds of Formula III in accordance with Part B:

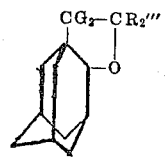

Therefore, cleavage and cyclization can be carried out repeatedly, as desired.

The following examples illustrate the present invention and will enable those skilled in the art to practice the same.

EXAMPLE 1

1-Adamantanemalonic Acid 15.1 parts of 1-adamantanol (0.11 mole) and 17.6 parts of diethyl malonate (0.11 mole) were stirred in 100 parts of n-hexane at 0°–5° C. while gaseous boron trifluoride was passed over the surface of the mixture. On saturation of the reaction mixture with boron trifluoride, as indicated by fumes emitting from the drying tube, boron trifluoride passage was stopped but stirring was continued at room temperature for 1.75 hours.

The mixture was then stirred in an ice-salt bath and sufficient 50 percent aqueous potassium hydroxide was added to neutralize the excess acid, the whole being maintained below 10° C. throughout. Sixty parts of ethanol, 25 parts of water, and 20 parts of potassium hydroxide were then added and the bulk of the hexane was removed by distillation through a Vigreux column. The resulting mixture was refluxed for 20 hours. It was then allowed to cool to room temperature and extracted with ether. The ether extract was separated and washed with water. The resulting aqueous phase was stirred in an ice bath while 20 percent aqueous sulfuric acid was slowly added until the pH was below 1. Initially a fine precipitate containing inorganic material was deposited. At low pH, a coarser precipitate of the crude dicarboxylic acid precipitated and was collected by filtration. Recrystallization of the latter precipitate from a hexane-acetone solvent mixture afforded 14 parts of 1-adamantanemalonic acid, M.P. 188°–192° C.

(d). Analysis—Calc.: C, 65.52; H, 7.61. Found: C, 65.80; H, 7.58.

EXAMPLE 2

Diethyl 1-Adamantanemalonate

After a reaction between 15.1 parts of 1-adamantanol and 17.6 parts of diethyl malonate with boron trifluoride had been carried out as described hereinabove in Example 1, the mixture was cooled in an ice bath while 75 parts of 99 percent ethanol were added with stirring. The temperature of the mixture was maintained below 5° C. while sufficient 5 percent aqueous potassium hydroxide solution to make the mixture alkaline was added. The resulting mixture was rapidly extracted with ether, and the ether layer washed with ice-cold water and dried over magnesium sulfate. The ether was removed by distillation to afford oily crystals of a boron difluoride complex of diethyl 1-adamantanemalonate. This complex was heated in boiling heptane, and the heptane was slowly distilled off through a Vigreux column until the distillate was non-acidic. Diethyl 1-adamantanemalonate was obtained from the residual oil by distillation under reduced pressure to afford a colorless oil boiling in the range; 128°-131° C./0.25 mm. Hg. Elemental analysis was carried out: found for C, 69.54 (cal., 69.39); found for H, 8.99 (calc., 8.90).

EXAMPLE 3

1-Adamantaneacetic Acid 2.4 parts of 1-adamantanemalonic acid were heated; after liquefaction occurred, the substance was further heated to 185° C. for 1 hour. On cooling, there was obtained a white crystalline mass, which was recrystallized from aqueous acetone to produce 1.3 parts of pure 1-adamantaneacetic acid, melting at about 100° C. Elemental analysis was carried out: Found for C, 74.01 (calc., 74.19); found for H, 9.39 (cal., 9.34).

EXAMPLE 4

1-Adamantaneacetyl Chloride

Sixty parts of 1-adamantaneacetic acid and 125 parts of thionyl chloride were heated together under reflux for 2 hours. Removal of the excess thionyl chloride by distillation at normal pressure and distillation of the residue at reduced pressure afforded 61 parts of 1-adamantaneacetyl chloride, distilling in the range 84°-8° C./0.5 mm. Hg.

EXAMPLE 5

1-Adamantaneethanol 2.5 parts of 1-adamantaneacetic acid were dissolved in 50 parts of anhydrous diethylene glycol dimethyl ether and 2 parts of lithium aluminum hydride were added carefully to the solution with stirring and cooling. The resulting mixture was heated to 100° C. with stirring for 8-12 hours, and after cooling, poured slowly onto cracked ice. Acidification, extraction into ether, separation and washing of the organic phase with water, followed by removal of the solvent by distillation afforded the desired 1-adamantaneethanol which was purified by crystallization to give 2 parts of pure product, melting at about 73°-74° C.

EXAMPLE 6

1-Adamantaneethanol

Twenty parts of 1-adamantaneacetic acid were added in portions to a cooled suspension of 8 parts of lithium aluminum hydride in 400 parts of anhydrous diethylene glycol dimethyl ether. The reaction mixture was allowed to warm to room temperature, and thereafter stand overnight at room temperature. The excess lithium aluminum hydride was destroyed by the cautious addition of ethanol, and the resulting mixture poured on to cracked ice. Acidification, extraction into ether, separation and washing the organic phase with water, followed by removal of the solvent afforded 1-adamantaneethanol, which was purified by sublimation at reduced pressure to give 17.3 parts of pure product, melting at about 76°-78° C.

Analysis: Calc. for $C_{12}H_{20}O$: C, 79.94; H, 11.18. Found: C, 79.67; H, 11.06.

EXAMPLE 7

2-Chloro-1-Adamantaneethanol

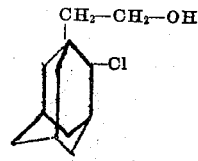

Ten parts of 1-adamantaneethanol were dissolved in 100 parts of carbon tetrachloride and the solution shaken vigorously during 10-15 minutes with three 150 milliliter portions of cold, freshly prepared, approximately 0.25 molar hypochlorous acid solution. After separation, the organic layer was washed with 5 percent sodium bicarbonate solution, dried over anhydrous potassium carbonate, and allowed to stand at room temperature overnight. Removal of the solvent afforded 11.0 parts of a pale yellow oil containing a number of components which were separated by chromatography on silica gel to give 15.8 parts of crude 2-chloro-1-adamantaneethanol.

EXAMPLE 8

1-Acetonyladamantane

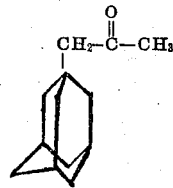

Diethyl ethoxymagnesiummalonate was prepared from diethyl malonate (68.6 g.), magnesium (10 g.), and anhydrous ethanol (51 ml.) in ether (51 ml.). The mixture was stirred and maintained at a gentle reflux while a solution containing 1-adamantaneacetyl chloride (80 g.) in dry ether (160 ml.) was slowly added. During the addition the reaction mixture became almost solid. When all the ethereal acid chloride had been added, the mixture was allowed to stand for 2 hours, and was then treated with dilute sulfuric acid and ether until the solid had all dissolved. The ether layer was separated, washed with water, and after removing the ether by distillation, the residue was boiled under reflux for 16 hours with a mixture containing glacial acetic acid (220 ml.), sulfuric acid (30 ml.) and water (100 ml.). After removing the bulk of the acetic acid by distillation in vacuum, the cooled solution was neutralized with 20 percent sodium hydroxide and extracted with ether. The ether extract was separated, washed with water and dryed over magnesium sulfate. The ether was removed by distillation to leave a colorless oil. Distillation of the oil at reduced pressure gave 1-acetonyladamantane, 57.4 g. (79 percent of theory), distilling at about 76°–78° C./0.15 mm Hg. Analysis for $C_{13}H_{20}O$: Calc., C, 81.19; H, 10.49. Found: C, 80.68; H, 10.76.

EXAMPLE 9

α,N-Dimethyl-1-Adamantaneethylamine

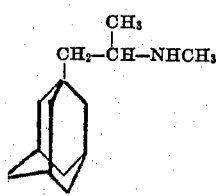

Five parts of 1-acetonyladamantane, 97 parts of a 10 percent solution of methylamine in ethanol, and 10 parts of glacial acetic acid were boiled under reflux for one hour. After cooling, 0.25 parts of platinum oxide were added and the mixture hydrogenated at 60 psi for 4 hours at room temperature using a Parr apparatus. The catalyst was removed by filtration, the filtrate acidified with dilute acid, the ethanol removed therefrom by distillation, and the resulting aqueous residue extracted with ether. The aqueous phase was basified and again extracted with ether. Removal of the ether and distillation of the residue afforded 4 parts of the desired amine, α,N-dimethyl-1-adamantaneethylamine, as a colorless oil; B.P. = 82°–84° C./0.55 mm Hg. Analysis: Calc. for $C_{14}H_{25}N$: C, 81.10; H, 12.15; N, 6.76. Found: C, 80.66; H, 11.91; N, 7.12.

EXAMPLE 10

N-Chloro-α,N-Dimethyl-1-Adamantaneethylamine

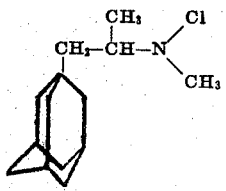

Ten parts of α,N-dimethyl-1-adamantaneethylamine were dissolved in 150 parts of methylenedichloride and the solution stirred for two hours during which time two separate portions of 150 parts each of sodium hypochlorite solution were added. After separation, the organic layer was washed with water and dried over anhydrous magnesium sulfate. Removal of the solvent gave 11.8 parts of a pale-yellow oil, N-chloro-α,N-dimethyl-1-adamantaneethylamine.

EXAMPLE 11

2-Chloro-α,N-Dimethyl-1-Adamantaneethylamine Hydrochloride

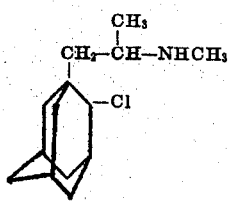

11.7 parts of N-chloro-α,N-dimethyl-1-adamantaneethylamine dissolved in 400 parts of 5N sulfuric acid in glacial acetic acid. The solution was irradiated, using a 1 liter photochemical reactor, for 1.5 hours, after which time a test sample gave no reaction for N-chloramine when treated with potassium iodide solution, thus showing that the reaction had proceeded to completion. The mixture was basified with 20 percent sodium hydroxide solution and extracted with ether. The ether extract was washed with water, dried over anhydrous magnesium sulfate, and the ether removed until the residual volume equalled approximately 150 ml. Dry hydrogen chloride was passed into the solution, thus forming the hydrochloride salt of the amine which was recovered as a crystalline mass by filtration and was recrystallized from ether/ethanol to give 10.9 parts of 2-chloro-α,N-dimethyl-1-adamantaneethylamine hydrochloride: M.P. = 213° C. Analysis—Calc. for $C_{14}H_{24}ClN \cdot HCl$: C, 60.43; H, 9.05; N, 5.03. Found: C, 60.25; H, 8.99; N, 4.95.

EXAMPLE 12

Adamantano(2,1-b)tetrahydrofuran

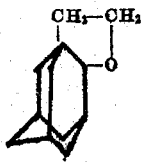

1-Adamantaneethanol (0.9 g.; 0.005 mole) and lead tetraacetate (2.9 g.; 0.065 mole) in benzene (35 ml.) were boiled under reflux, with stirring, for three hours. After cooling, the mixture was poured onto ice-water and extracted with ether. The ether layer was washed with water, dried over magnesium sulfate and the ether removed by distillation to leave an oil. Chromatography on silica gel (35 g.) in a 19:1 benzene-ethyl acetate solvent mixture gave the pure cyclic ether, 0.78 g, Calculated for $C_{12}H_{18}O$: C, 80.84; H, 10.18. Found: C, 80.46; H, 9.89. The n.m.r. spectrum showed the presence of a doublet (1 proton) at 6.65τ, confirming the cyclic nature of the product.

EXAMPLE 13

Adamantano(2,1-b)tetrahydrofuran

A sample of 2-chloro-1-adamantaneethanol, prepared as described in Example 7, was heated at 200° C. in an atmosphere of nitrogen for 8 hours and the product chromatographed on silica gel to give adamantano-(2,1-b)tetrahydrofuran.

EXAMPLE 14

Adamantano(2,1-b)tetrahydrofuran

A solution of iodine (3 moles) in benzene was added, from a dropping funnel during 6 hours, to a stirred, refluxing, mixture of 1-adamantaneethanol (1 mole) and mercuric acetate (3 moles) in benzene. The mixture was cooled, poured into ice-water and extracted with ether. The ether extract was washed with sodium thiosulfate followed by water, and adamantano(2,1-b)tetrahydrofuran was isolated therefrom as in the previous examples.

EXAMPLE 15

1,2-Dimethyladamantano(2,1-b)pyrrolidine

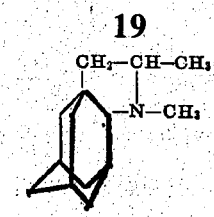

2-Chloro-1-[2-(methylamino)propyl]adamantane obtained from 18.4 grams of the hydrochloride thereof prepared as described in Example 11 was heated in an atmosphere of nitrogen at 185°–95° C. for 14 hours. Thereafter, the amine product was permitted to cool to room temperature, resulting in a somewhat gummy solid which was partitioned between ether and 2N hydrochloric acid. The aqueous phase was separated, made alkaline with 10 percent sodium hydroxide solution, and then extracted with ether. The ether layer was separated, washed with water, dried over magnesium sulfate, and the ether removed by distillation leaving an oily residue.

The oil was dissolved in 100 milliliters of acetic anhydride, and the resulting solution was kept at room temperature overnight and then refluxed for 2 hours. The acetic anhydride was removed in an evaporator. The residue was again partitioned between ether and 2N hydrochloric acid and the aqueous phase worked up as before to give a pale yellow oil, the desired 1,2-dimethyladamantano(2,1-b)adamantane.

EXAMPLE 16

1,2-Dimethyladamantano(2,1-b)pyrrolidine hydrochloride

The free base, 1,2-dimethyladamantano(2,1-b)pyrrolidine, prepared as described in Example 15, was dissolved in dry ether and dry hydrogen chloride passed into the solution causing precipitation of the corresponding hydrochloride salt, 1,2-dimethyladamantano(2,1-b)pyrrolidine hydrochloride. The precipitated salt was separated by filtration and, after recrystallization from ethanol-dioxan, melted at about 256° C. Analysis—calc. for $C_{14}H_{23}N \cdot HCl$: C, 69.54; H, 10.01; N, 5.79. Found: C, 69.20; H, 10.35; N, 6.16.

EXAMPLE 17

1-Adamantaneacetyl Bromide

Slightly over three molecular proportions of 1-adamantaneacetic acid are reacted with one molecular proportion of phosphorus tribromide, to yield 1-adamantaneacetyl bromide.

EXAMPLE 18

1-Adamantaneacetyl Iodide

Dry hydrogen iodide is passed into a solution of 1-adamantaneacetyl chloride, prepared as described in Example 4, to obtain the corresponding 1-adamantaneacetyl iodide.

EXAMPLE 19

1-Adamantanol and di-n-butyl malonate are reacted to yield di-n-butyl 1-adamantanemalonate (m.w., 350.5).

EXAMPLE 20

1-Adamantanol and dimethyl malonate are reacted to yield dimethyl 1-adamantanemalonate (m.w., 266.3).

EXAMPLE 21

1-Adamantanol and diisopropyl malonate are reacted to yield diisopropyl 1-adamantanemalonate (m.w., 322.4).

EXAMPLE 22

1-Adamantaneacetic acid and excess methanol are reacted together, in the presence of a minor amount of sulfuric acid, yielding methyl 1-adamantaneacetate (m.w., 208.3).

EXAMPLE 23

1-Adamantaneacetic acid and excess isobutanol are reacted together in the presence of a minor amount of sulfuric acid, yielding isobutyl 1-adamantaneacetate (m.w., 250.4).

EXAMPLE 24

1-Adamantaneacetyl chloride and gaseous hydrogen are reacted together in xylene, in the presence of a minor amount of palladium on barium sulfate, to yield 1-adamantaneacetaldehyde (m.w., 178.3).

EXAMPLE 25

1-Adamantaneacetaldehyde and ammonia are reacted together, under the hydrogenation conditions of Example 24, yielding 1-adamantaneethylamine (m.w., 179.3).

EXAMPLES 26–27

1-Adamantaneethylamine and sodium hypochlorite are reacted together, yielding 2-chloro-1-adamantaneethylamine (m.w., 213.8) and upon heating, adamantano(2,1-b)pyrrolidine (m.w., 177.3).

EXAMPLES 28–30

1-Acetonyladamantane, prepared as described in Example 8, and sec-butylamine are reacted together, yielding N-sec-butyl-α-methyl-1-adamantaneethylamine. Upon reaction with sodium hypoiodite, there is obtained 2-iodo-N-sec-butyl-α-methyl-1-adamantaneethylamine (m.w., 375.3). Cyclization produces 1-sec-butyl-2-methyladamantano(2,1-b)pyrrolidine:

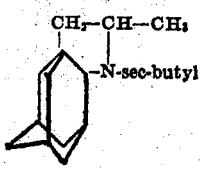

EXAMPLES 31–34

1-Adamantaneacetaldehyde and n-propylmagnesium bromide are reacted together, and the resulting product oxidized to yield 1-(butyrylmethyl)adamantane(m.w., 220.4), which is converted by reductive amination with methylamine to α-n-propyl-N-methyl-1-adamantaneethylamine (m.w., 235.4). This latter product is reacted with hypochlorous acid, yielding the corresponding 2-chloro-α-n-propyl-N-methyl-1-adamantaneethylamine, which upon heating cyclizes to 1-methyl-2-n-propyladamantano(2,1-b)pyrrolidine:

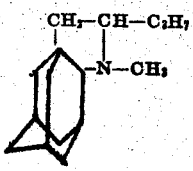

EXAMPLE 35

Diacetate of 2-Hydroxy-1-adamantaneethanol

A mixture of adamantano(2,1-*b*)tetrahydrofuran (11.3 g.), acetic anhydride (100 ml.) and boron trifluoride etherate (12.5 ml.) were mixed and permitted to stand at room temperature for 2 hours and then poured onto cracked ice (250 g.) and allowed to stand overnight. As a result of these operations, there was obtained, in solution, the diacetate of 2-hydroxy-1-adamantaneethanol.

EXAMPLE 36

2-Hydroxy-1-adamantaneethanol

The solution prepared as described in Example 35 and containing the diacetate of 2-hydroxy-1-adamantaneethanol was neutralized with 20 percent sodium hydroxide and extracted with ether. The organic phase was washed with water, dried over magnesium sulfate, and the ether removed by distillation to afford 2-hydroxy-1-adamantaneethanol as the diacetate, as an oil which was not further purified. The oil was taken up in ethanol (100 ml.). Potassium hydroxide (12 g.) was added, and the mixture boiled under reflux for 3 hours. Water (250 ml.) was added and the ethanol removed by distillation to give the 2-hydroxy-1-adamantaneethanol as a crystalline deposit which was recovered by filtration and dried to give 9.32 g. of product. Recrystallization from acetone/hexane afforded pure 2-hydroxy-1-adamantaneethanol, 8.02 g., m.p., 98°–100° C. Analysis calc. for $C_{12}H_{20}O_2$: C, 73.43; H, 10.27. Found: C, 73.70; H, 10.33.

EXAMPLE 37

Adamantano(2,1-*b*)tetrahydrofuran-2-one

One part of 2-hydroxy-1-adamantaneethanol, 46 parts of lead tetraacetate and 50 parts of benzene were boiled under reflux for 3 hours. The mixture was allowed to cool and then poured into water. Ether was added and the organic phase was separated, washed with water, aqueous 5 percent sodium bicarbonate solution, again with water, and then dried over magnesium sulfate. The ether was removed by distillation leaving an almost colorless oil containing several components. Chromatography of the oil on silica-gel yielded a fraction containing 0.35 parts of an oil which showed absorption in the infrared at 1,780 cm$^{-1}$, indicating the desired adamantano(2,1-*b*)tetrahydrofuran-2-one product.

EXAMPLE 38

2-Hydroxy-1-adamantaneacetic acid

Alkaline hydrolysis of the adamantano(2,1-*b*)tetrahydrofuran-2-one of Example 37, and subsequent work up, yielded 2-hydroxy-1-adamantaneacetic acid. It was recrystallized from ethylacetate-n-hexane. The recrystallized substance melted at about 112.5°–114° C.

EXAMPLE 39

Adamantano(2,1-*b*)tetrahydrofuran-2-one

Sublimation of 2-hydroxy-1-adamantaneacetic acid in vacuo yielded adamantano(2,1-*b*)tetrahydrofuran-2-one as a waxy solid melting at about 81°–84° C.

The following additional examples are prepared in accordance with the foregoing examples and teachings:

EXAMPLES 40–81

| Name | Molecular Weight |
|---|---|
| Diacetate of β-n-butyl-β-ethyl-2-hydroxy-1-adamantaneethanol | 364.5 |
| β-n-Butyl-β-ethyl-2-hydroxy-1-adamantaneethanol | 280.5 |
| Diacetate of α,β-dimethyl-2-hydroxy-1-adamantaneethanol | 308.4 |
| α,β-Dimethyl-2-hydroxy-1-adamantaneethanol | 224.3 |
| Diacetate of α,α-di-n-hexyl-2-hydroxy-1-adamantaneethanol | 448.7 |
| α,α-Di-n-hexyl-2-hydroxy-1-adamantaneethanol | 364.6 |
| Diacetate of α,α-dimethyl-2-hydroxy-1-adamantaneacetic acid | 322.4 |
| α,α-Dimethyl-2-hydroxy-1-adamantaneacetic acid | 238.3 |
| α,α-Dimethyl-1-adamantaneacetyl bromide | 285.2 |
| Methyl α-n-hexyl-1-adamantaneacetate | 282.4 |
| α-n-Butyl-α-methyl-1-adamantaneacetaldehyde | 248.4 |
| 1-(n-Heptanoylmethyl)adamantane | 262.4 |
| α,α,β,β-Tetramethyl-1-adamantaneethanol | 236.4 |
| α,α,β,β-Tetramethyl-2-chloro-1-adamantaneethanol | 270.8 |
| 2,2,3,3-Tetramethyladamantano(2,1-b)-tetrahydrofuran | 234.4 |
| β-Ethyl-α-n-hexyl-1-adamantaneethanol | 292.5 |
| β-Ethyl-α-n-hexyl-2-iodo-1-adamantaneethanol | 418.4 |
| 3-Ethyl-2-n-hexyladamantano(2,1-b)tetrahydrofuran | 290.5 |
| β,β-Dimethyl-N-chloro-1-adamantaneethylamine | 241.8 |
| β,β-Dimethyl-2-chloro-1-adamantaneethylamine | 241.8 |
| α, ,N-Dimethyl-β-n-hexyl-1-adamantaneethylamine | 277.5 |
| α,N-Dimethyl-β-n-hexyl-N-bromo-1-adamantaneethylamine | 370.4 |
| 3-n-Butyl-2-ethyl-1-methyladamantano(2,1-b)pyrrolidine | 261.5 |
| 3-n-Propyladamantano(2,1-b)tetrahydrofuran | 220.4 |
| 2-t-Butyl-1-methyladamantano(2,1-b)pyrrolidine | 247.4 |
| Di-n-hexyl 1-adamantanemalonate | 407.6 |
| α-n-Hexyl-1-adamantaneacetyl chloride | 296.9 |
| 2-Chloro-β-n-butyl-β-ethyl-1-adamantaneethanol | 288.8 |
| α,α-Di-n-hexyl-1-adamantaneethanol | 348.6 |
| 2-iodo-α,β-di-n-propyl-1-adamantaneethanol | 390.4 |
| 3-n-butyl-3-ethyladamantano(2,1-b)tetrahydrofuran | 262.4 |
| 2,2-di-n-hexyladamantano(2,1-b)tetrahydrofuran | 346.6 |
| 2,3-di-n-propyladamantano(2,1-b)tetrahydrofuran | 262.4 |
| N,α,β,β-Tetramethyl-1-adamantaneethylamine | 235.4 |
| 2-Chloro-β-ethyl-β-n-propyl-N-n-hexyl-1-adamantaneethylamine | 368.1 |
| β-Methyl-N-n-butyl-N-iodo-1-adamantaneethylamine | 375.3 |
| 1,2,3,3-Tetramethyladamantano(2,1-b)pyrrolidine, and its hydrochloride | 233.4 269.9 |
| 1-n-Butyl-2-methyladamantano(2,1-b)pyrrolidine, and its hydrobromide | 247.4 |
| 3-Nthyl-3-n-propyl-1-n-hexyladamantano-(2,1-b)pyrrolidine, and its hydriodide | 331.6 459.5 |

In preferred embodiments, the present invention is directed to subgenera as follows:

Ia

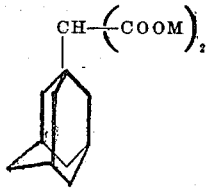

IIa

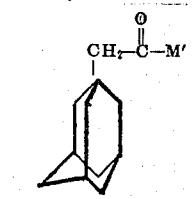

IIIa

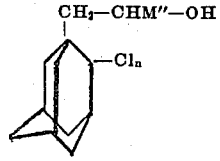

IVa 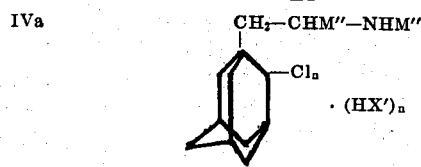

Va 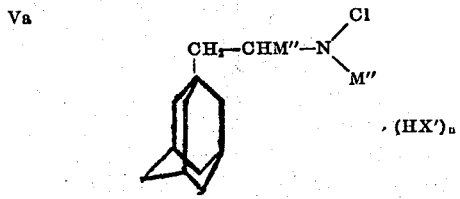

VIa 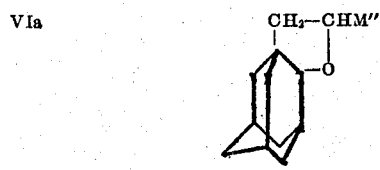

VIIa 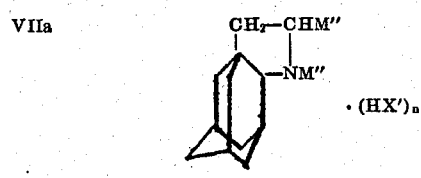

VIIIa 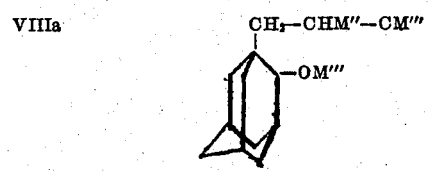

wherein M represents hydrogen or loweralkyl of from one to three, both inclusive, carbon atoms, the same moiety in each occurrence; M' represents chloro, hydrogen, loweralkyl of from one to three, both inclusive, carbon atoms, or loweralkoxy of from one to three, both inclusive, carbon atoms; each M'' independently represents hydrogen or loweralkyl of from one to three, both inclusive, carbon atoms; M''' represents hydrogen or acetyl, the same moiety in each occurrence; X' represents bromo, chloro, or iodo; and each n independently represents an integer of from 0 to 1, both inclusive.

The compounds of these preferred embodiments exhibit to an enhanced degree the properties generally exhibited by the present invention. In addition, they admit of ready synthesis, in accordance with the methods described hereinabove.

We claim:

1. A compound selected from the group consisting of the compounds of the formulae

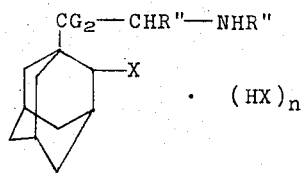

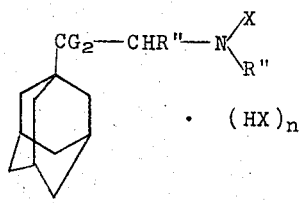

wherein each G independently represents hydrogen or straightchain alkyl of from one to six, both inclusive, carbon atoms; each R'' independently represents hydrogen or alkyl of from one to six, both inclusive, carbon atoms, X represents halo; and n represents an integer of from 0 to 1, both inclusive.

2. A compound of claim 1 which is of the formula

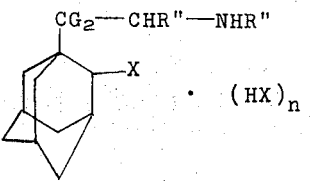

3. The compound of claim 2 which is 2-chloro-1-[2-(methylamino)propyl]adamantane.

4. A compound of claim 1 which is of the formula

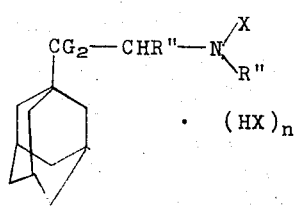

5. The compound of claim 4 which is N-chloro-α,N-dimethyl-1-adamantaneethylamine.

* * * * *